2 Sheets—Sheet 1.

T. P. WILLIAMSON.
Bee-Hive.

No. 211,537.                    Patented Jan. 21, 1879.

WITNESSES:
Achilles Schehl.
C. Sedgwick.

INVENTOR:
T. P. Williamson
BY Munn & Co.
ATTORNEYS.

T. P. WILLIAMSON.
Bee-Hive.

No. 211,537. Patented Jan. 21, 1879.

WITNESSES:

INVENTOR:
T. P. Williamson
BY
ATTORNEYS.

UNITED STATES PATENT OFFICE.

THOMAS P. WILLIAMSON, OF GOLCONDA, ILLINOIS.

IMPROVEMENT IN BEE-HIVES.

Specification forming part of Letters Patent No. 211,537, dated January 21, 1879; application filed September 6, 1878.

*To all whom it may concern:*

Figure 1:
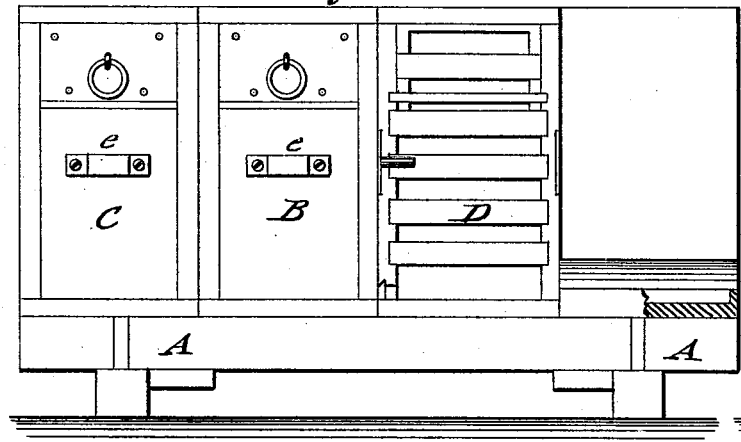
Figure 4:
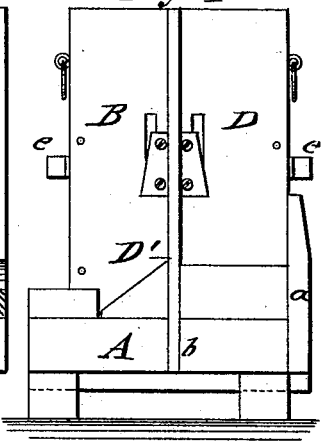
Figure 2:
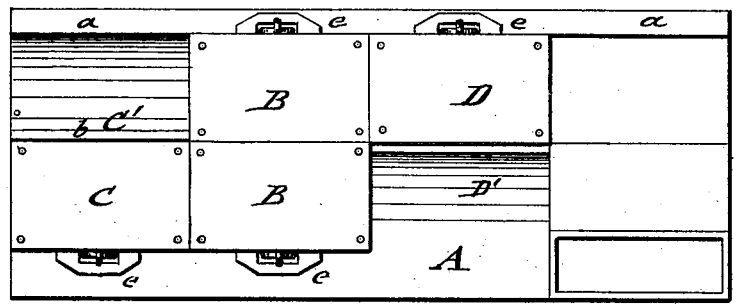
Figure 5:
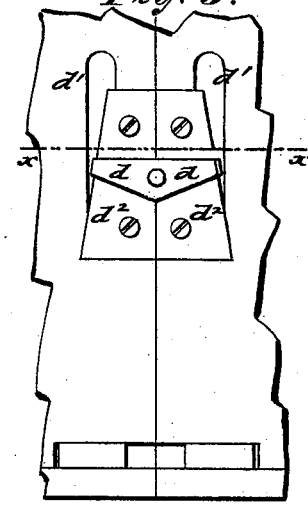
Figure 3:
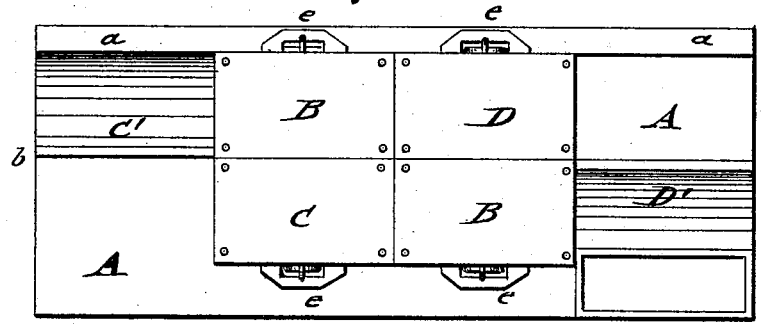
Figure 6:
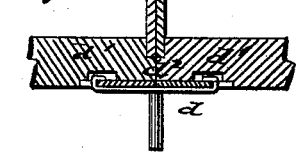
Figure 7:
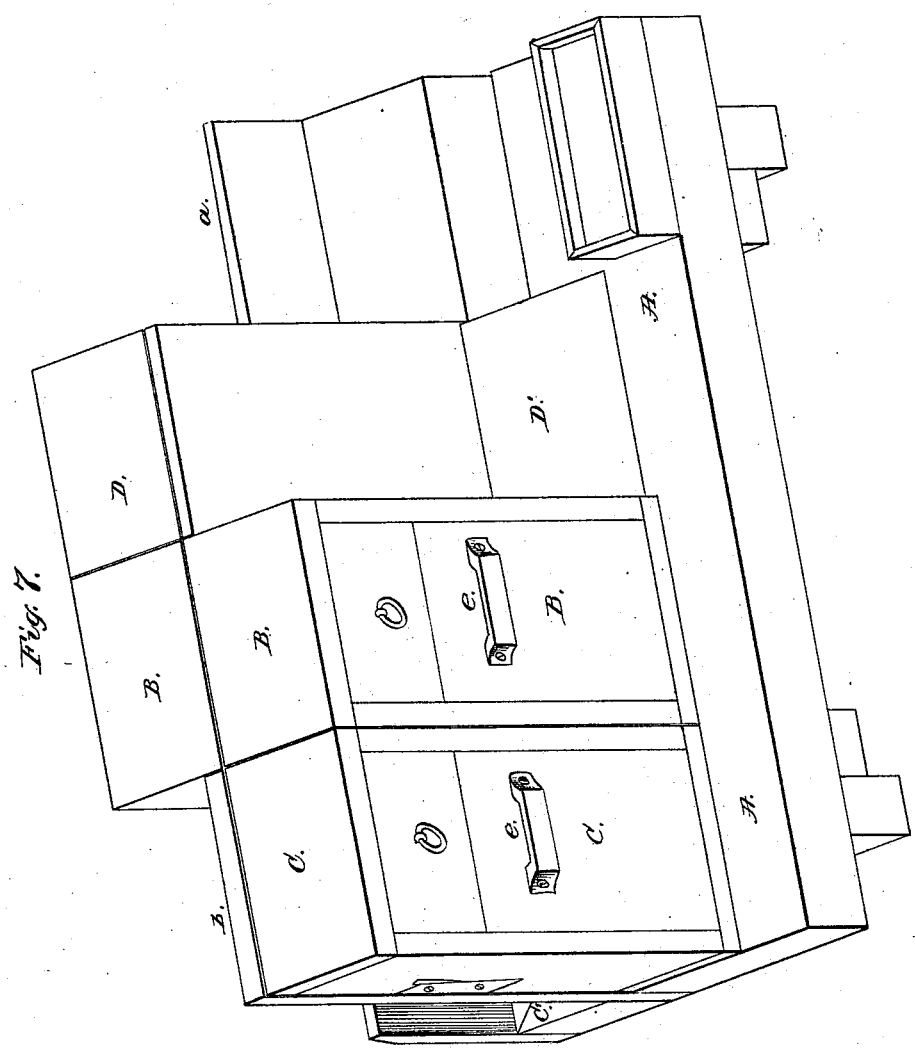

Be it known that I, THOMAS P. WILLIAMSON, of Golconda, in the county of Pope and State of Illinois, have invented a new and Improved Apparatus for Dividing Bee-Hives, of which the following is a specification:

In the accompanying drawings, Figure 1 represents a front elevation of my improved apparatus for dividing bee-hives, with one of the closing-walls removed to show the interior of one of the hive-sections. Fig. 2 is a top view, showing the hive-sections in position before dividing or colonizing. Fig. 3 is a top view, showing the hive-sections after the hive has been divided. Fig. 4 is an end view, showing the hive-sections. Figs. 5 and 6 are detail views of my apparatus for colonizing bees, showing the locking devices; and Fig. 7 is a perspective view.

Similar letters of reference indicate corresponding parts.

The invention will first be described in connection with the drawings, and then pointed out in the claims.

Referring to the drawings, A represents the supporting-table of my improved apparatus for dividing bee-hives, which table is provided with a rear guide-wall, $a$, and with longitudinal guide-slots $b$. The slot at one end is of twice the length of the slot at the other end of the table. The slots are not in line with each other; but the shorter slot is at one side, and the longer slot at the other side, of a common dividing or center line.

The shorter slot, $b$, is equal in length to the solid intermediate portion of the table, on which is placed a double hive, B B, that is made of two sections, which are connected by locking-hooks $d$. The locking-hooks $d$ enter recesses $d^1$ at the ends of the semi-sections, and bind on wedge-shaped locking-plates $d^2$.

The double hive B B is provided with handles $e$ at the front and rear, and made of any approved interior construction.

When the double hive is to be divided for forming halves of two hives, it is placed on the table, the locking-hooks are removed, the doors at the lower part closed, and then two empty semi-sections, C and D, placed one on each side of the double hive, as shown in Fig. 2 of the drawings.

The doors of the empty semi-sections C and D are closed, and the open sides of the same covered by means of vertical movable walls C' and D', which are supported by base-blocks on the table A, and guided by their downward-extending lower ends in the slots $b$ of the table as they move in said slots.

When the double hive and empty sections are placed in this position the front sections are slowly moved along the rear sections from the left to the right, which motion causes simultaneously the wall D' to be moved toward the right end of the table until the empty front section, C, covers the full rear section of the hive and the full front section the empty rear section, D. As the hive-sections are all kept closed during the motion, partly by the action of the movable walls C' and D', and partly by their overlapping each other, the bees have no chance to escape, so as to endanger the apiarist or get lost. When the hive is thus divided, the semi-sections are connected by the locking devices, then removed, and finally the doors opened, the hive being thus divided, so as to form two separate hives.

The same operation may be repeated in the swarming season.

If there are moths in the hive they are picked out, or the bees driven into another hive, saving thus the honey and killing the moths.

The yield of honey may thus be increased by this simple mode of dividing the hives, and thereby any loss of bees by swarming or otherwise prevented.

Having thus described my invention, I claim as new and desire to secure by Letters Patent—

1. The apparatus herein described for dividing or colonizing bees, consisting of two hives, each made in two sections, a slotted guide-table, and vertical movable walls, substantially as specified.

2. A supporting-table having rear wall, $a$, with slots $b$ of unequal length at opposite ends, in combination with a two-part separable hive, B B, and two sections, C D, whose open sides are covered by walls C' D', as and for the purpose specified.

THOMAS PORTER WILLIAMSON.

Witnesses:
 J. S. CRAWFORD,
 M. A. HOLLAND.